United States Patent
Cho et al.

(10) Patent No.: US 12,311,945 B2
(45) Date of Patent: May 27, 2025

(54) ECO-FRIENDLY VEHICLE AND LAUNCH CONTROL METHOD THEREFOR

(71) Applicants: HYUNDAI MOTOR COMPANY, Seoul (KR); KIA MOTORS CORPORATION, Seoul (KR)

(72) Inventors: Jin Kyeom Cho, Suwon-si (KR); Jea Mun Lee, Seoul (KR); Sung Bae Jeon, Ansan-si (KR); Hui Un Son, Suwon-si (KR); Joon Young Park, Seoul (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 269 days.

(21) Appl. No.: 16/703,455

(22) Filed: Dec. 4, 2019

(65) Prior Publication Data
US 2021/0009130 A1   Jan. 14, 2021

(30) Foreign Application Priority Data
Jul. 9, 2019  (KR) .......................... 10-2019-0082740

(51) Int. Cl.
*B60W 10/10*  (2012.01)
*B60W 10/08*  (2006.01)
(Continued)

(52) U.S. Cl.
CPC ...... *B60W 30/18027* (2013.01); *B60W 10/08* (2013.01); *B60W 10/10* (2013.01);
(Continued)

(58) Field of Classification Search
CPC ...... B60W 10/02; B60W 10/06; B60W 20/15; B60W 10/11; B60W 30/18027;
(Continued)

(56) References Cited

U.S. PATENT DOCUMENTS

| 4,497,395 | A  | * | 2/1985 | Nogami | G05G 1/32 |
| | | | | | 188/161 |
| 6,093,974 | A  | * | 7/2000 | Tabata | B60W 30/1819 |
| | | | | | 903/910 |
| 6,346,064 | B1 | * | 2/2002 | Hada | B60W 10/18 |
| | | | | | 477/901 |
| 2003/0171186 | A1 | * | 9/2003 | Okada | B60W 10/04 |
| | | | | | 477/71 |

(Continued)

FOREIGN PATENT DOCUMENTS

JP      2011255846 A      12/2011
KR    1020120058147      * 11/2010

OTHER PUBLICATIONS

Office Action cited in corresponding Korean application No. 119980045675; Jun. 20, 2024; 12 pp.

*Primary Examiner* — Matthew J. Reda
(74) *Attorney, Agent, or Firm* — Lempia Summerfield Katz LLC

(57) ABSTRACT

An eco-friendly vehicle and a launch control method for an eco-friendly vehicle reduces an unpleasant secondary launch effect based on a gear alignment state of a transmission in a specific situation. The launch control method includes: determining a first condition for enabling a preset stop control when the first condition is satisfied; turning off a control for generating a creep torque of a motor when a brake is released; controlling a transmission in an open state and enabling the control for generating the creep torque; and when a second condition for revolutions per minute (RPM) of the motor is satisfied, controlling the transmission in a lock state through a slip state.

11 Claims, 7 Drawing Sheets

(51) Int. Cl.
*B60W 30/18* (2012.01)
*B60W 50/14* (2020.01)

(52) U.S. Cl.
CPC ....... *B60W 50/14* (2013.01); *B60W 2050/146* (2013.01); *B60W 2510/082* (2013.01); *B60W 2520/10* (2013.01); *B60W 2520/28* (2013.01); *B60W 2540/12* (2013.01); *B60W 2552/15* (2020.02); *B60W 2710/08* (2013.01); *B60W 2710/10* (2013.01)

(58) Field of Classification Search
CPC ...... B60W 10/08; B60W 10/10; B60W 50/14; B60W 2050/146; B60W 2510/082; B60W 2520/10; B60W 2520/28; B60W 2540/12; B60W 2552/15; B60W 2710/08; B60W 2710/10; B60W 2510/081; B60W 2540/16; B60W 2710/083; B60W 30/18063; B60W 30/18072; B60W 30/181; B60W 40/076; B60W 2520/04; Y02T 10/62; B60Y 2300/18058; B60Y 2300/18091; B60K 35/00; B60K 2006/4825; B60K 6/48
See application file for complete search history.

(56) References Cited

U.S. PATENT DOCUMENTS

| | | | |
|---|---|---|---|
| 2006/0037804 A1* | 2/2006 | Sugo | B60K 17/35 180/249 |
| 2009/0203496 A1* | 8/2009 | Staub | B60W 30/18063 701/87 |
| 2011/0029172 A1* | 2/2011 | Kwon | B60L 15/2009 318/452 |
| 2011/0178666 A1* | 7/2011 | Marcus | B60L 15/2009 701/22 |
| 2011/0307134 A1* | 12/2011 | Yoshimi | B60W 10/30 903/905 |
| 2013/0017928 A1* | 1/2013 | Oh | B60W 10/182 477/203 |
| 2013/0090800 A1* | 4/2013 | Nakamura | B60L 15/2063 701/22 |
| 2016/0185254 A1* | 6/2016 | Ariyoshi | B60L 7/26 701/22 |
| 2017/0001640 A1* | 1/2017 | Asakura | B60W 30/16 |
| 2018/0105159 A1* | 4/2018 | Park | B60K 6/442 |
| 2018/0141535 A1* | 5/2018 | Yoshioka | B60W 20/00 |
| 2018/0141556 A1* | 5/2018 | Goh | B60W 30/18118 |
| 2018/0202408 A1* | 7/2018 | Majima | F02N 11/0837 |
| 2019/0152480 A1* | 5/2019 | Smyczynski | B60W 20/15 |
| 2021/0237729 A1* | 8/2021 | Oshida | B60K 28/10 |

* cited by examiner

ECO-FRIENDLY VEHICLE AND LAUNCH CONTROL METHOD THEREFOR

CROSS-REFERENCE TO RELATED APPLICATION

This application claims priority to and the benefit of Korean Patent Application No. 10-2019-0082740, filed on Jul. 9, 2019, the entire contents of which are incorporated herein by reference.

FIELD

The present disclosure relates to an eco-friendly vehicle and a launch control method for reducing an unpleasant secondary launch effect.

BACKGROUND

The statements in this section merely provide background information related to the present disclosure and may not constitute prior art.

A term "coasting" may be used to indicate an inertia running state of a vehicle in which the vehicle continuously travels with an inertia without receiving driving force. In general, coasting refers to driving in a state in which an accelerator pedal sensor (APS) and a brake pedal sensor (BPS) are not manipulated.

Torque applied to a drive shaft during coasting may be referred to as inertia torque or coasting torque. In a general internal combustion engine vehicle, idle torque of an engine is also transmitted to a drive shaft by a torque converter and a transmission in a state in which the APS and the BPS are not pressed. This is also referred to as creep torque.

During coasting, such creep torque is transferred to the drive shaft by an engine, and simultaneously, driving load based on vehicle speed is applied in an opposite direction to the creep torque, and in this regard, coasting torque is configured by the total of the two, which will be described with reference to FIG. 1.

FIG. 1 is a diagram showing an example of a relationship between coasting torque and vehicle speed during coasting of a general vehicle.

Referring to FIG. 1, because a transmission is generally in a low stage in the case of a low vehicle speed, when speed of an input terminal of the transmission is lower than an idle RPM of an engine, idle torque of the engine is transferred and a vehicle also travels forward by creep torque. In contrast, because a transmission is in a relatively high stage in the case of a high vehicle speed, when speed of the input terminal of the transmission is higher than the idle RPM of the engine, drag based on fuel cut of the engine is transferred and coasting torque is generated.

Recently, as interest in the environment increases, there has been a great deal of research on hybrid electric vehicles (HEV) and electric motors, which use an electric motor as a driving source.

In a vehicle including such an electric motor, an engine is not present or is not always turned on, and thus creep torque from an engine is not mostly generated. However, generally, a motor is driven to perform control for generating creep torque in order to embody the characteristics of a general internal combustion engine. Accordingly, in a vehicle including an electric motor, similarly to FIG. 1, forward torque based on idle momentum and a torque increasing effect of a torque converter of an internal combustion engine in the case of low speed is illustrated, and reverse torque based on drag of an engine from which fuel injection is stopped in the case of high speed is illustrated. To this end, a controller for controlling torque of a motor performs torque control on the motor using a pulse width modulation (PWM) method. As such, an area in which the forward torque is illustrated may be referred as a creep area, and an area in which the reverse torque is illustrated may be referred as a coasting area. In this case, the reverse torque may be embodied by regenerative brake.

However, in a general eco-friendly vehicle, a controller for determining creep torque transmits a creep torque command as zero (0) in a situation in which a brake pedal value equal to or greater than a predetermined value is input at a predetermined vehicle speed or less, for example, in a vehicle stop condition. Accordingly, when the creep torque command is 0 in the vehicle stop condition, a controller for controlling torque of a motor generally turns off pulse width modulation (PWM) control in order to increase fuel efficiency.

In particular, when a vehicle stop condition is satisfied on a downhill road, if a driver takes their foot off the brake pedal, a launch effect of a vehicle primarily occurs via a downhill road, and as a vehicle stop condition is released and creep torque control of a motor is started (or re-started), a launch effect secondarily occurs due to creep torque. However, there is a time difference between a launch effect due to creep torque of a motor and a launch effect via a downhill road and an impact effect due to gear alignment of a transmission is also added, and thus there is a problem in that a driver doubly experiences a launch effect, which will be described with reference to FIG. 2.

FIG. 2 is a diagram for explanation of a form in which a double launch effect occurs when a general eco-friendly vehicle launches while stopped on a downhill road.

FIG. 2 shows three graphs, a horizontal axis commonly indicates time in the three graphs, an upper vertical axis indicates acceleration, a middle vertical axis indicates torque of a motor, and a lower vertical axis indicates a brake pedal sensor (BPS) value.

Referring to FIG. 2, a primary launch effect 20 occurs due to acceleration via a downhill road from a time point 10 when a driver releases a brake pedal while a vehicle is stopped on a downhill road. Then, when PWM control begins 30 on motor torque as brake is released, after a while, a secondary launch effect 40 occurs due to acceleration via creep torque of a motor. However, the secondary launch effect involves shocks due to a gear alignment state of a transmission, and thus there is a problem in that a driver experiences a sense of unfamiliarity or displeasure. The reason of the secondary launch effect having such attributes will be described below.

A transmission includes a plurality of gears, and in this regard, a clearance that is referred to as backlash is present between the gears for smooth driving. That is, one saw tooth of one-side gear among the two engaged gears is always positioned between two saw teeth (for convenience, which are referred to as a first saw tooth and a second saw tooth) of the other-side gear, and in this regard, when rotating in one direction corresponding to a forward driving situation, the saw tooth of one-side gear contacts the first saw tooth of the other-side gear, which is positioned at a front side of a rotation direction, and is spaced apart from the second saw tooth of the other-side gear, which is positioned at a rear side of the rotation direction, by a backlash. As such, a gear alignment state in which a gear contacts the first saw tooth at the front side during forward driving is referred to as front alignment. In contrast, force is applied to a gear in an opposite rotation direction to the case of forward driving during brake on a downhill road, and thus a corresponding saw tooth of a one-side gear contacts the second saw tooth at the front side and is spaced apart from the first saw tooth. Accordingly, this gear alignment state is referred to as rear alignment.

We have discovered that a gear of a transmission is positioned in a rear alignment state when a vehicle is stopped, but as PWM control begins on motor torque, the gear of the transmission is transitioned to a front alignment state such that mechanical shocks are generated at a moment when the saw tooth of the one-side gear is changed to a state in which the saw tooth contacts the first saw tooth of the other-side gear from a state in which the saw tooth is spaced apart therefrom. Such shocks involve a time difference with a time point 30 when motor torque is applied and affects the attributes of the secondary launch effect.

We have also found that even though a method of maintaining PWM control of motor torque without PWM control off in the case of stoppage in a downhill road or variably controlling creep torque depending on a downhill gradient is considered to overcome so-called double launch effect, fuel efficiency is adversely affected because power is consumed when PWM control is maintained, and variable control of creep torque is vulnerable to an error of measuring a downhill gradient and an error that may occur when the weight of a vehicle is changed.

SUMMARY

The present disclosure provides an eco-friendly vehicle and a launch control method therefor for overcoming a double launch effect that may occur in a specific situation.

In particular, the present disclosure provides an eco-friendly vehicle and a launch control method therefor for relieving shocks due to backlash that occurs when a vehicle launches while stopped in a downhill road situation.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

In one form of the present disclosure, a launch control method of an eco-friendly vehicle includes: determining, by a controller, whether a first condition for enabling a preset stop control is satisfied; when the first condition is satisfied, turning off by the controller a control for generating a creep torque of a motor for the eco-friendly vehicle; when a brake is released, controlling, by the controller, a transmission of the eco-friendly vehicle in an open state and enabling the control for generating the creep torque; and when a second condition for revolutions per minute (RPM) of the motor is satisfied, controlling, by the controller, the transmission in a lock state through a slip state.

In another aspect of the present disclosure, an eco-friendly vehicle including a motor includes: a first controller configured to control the motor, a second controller configured to control a transmission connected to the motor, and a third controller configured to transmit a creep torque control command to the first controller and to transmit a command for a transmission state to the second controller. In particular, the third controller determines whether a first condition for enabling a preset stop control is satisfied, turns off a control for generating a creep torque of the motor when the first condition is satisfied, controls the transmission in an open state, and enables the control for generating the creep torque when a brake is released. Further, the third controller controls the transmission in a lock state through a slip state when a second condition for revolutions per minute (RPM) of the motor is satisfied.

In another aspect of the present disclosure, a controller for an eco-friendly vehicle includes: a determination unit configured to determine whether a first condition for enabling a preset stop control is satisfied and to make a first request for enabling the preset stop control when the first condition is satisfied; and a controller configured to turn off a control for generating a creep torque of a motor upon the first request. In particular, the determination unit makes a second request to the controller for turning off the preset stop control and enabling a launch control when a brake is released, and the controller controls a transmission in an open state and enables the control for generating the creep torque upon the second request. In one form, the determination unit makes a third request to the controller for turning off the launch control upon determining that a second condition for revolutions per minute (RPM) of the motor is satisfied, and the controller controls the transmission in a lock state through a slip state upon the third request.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
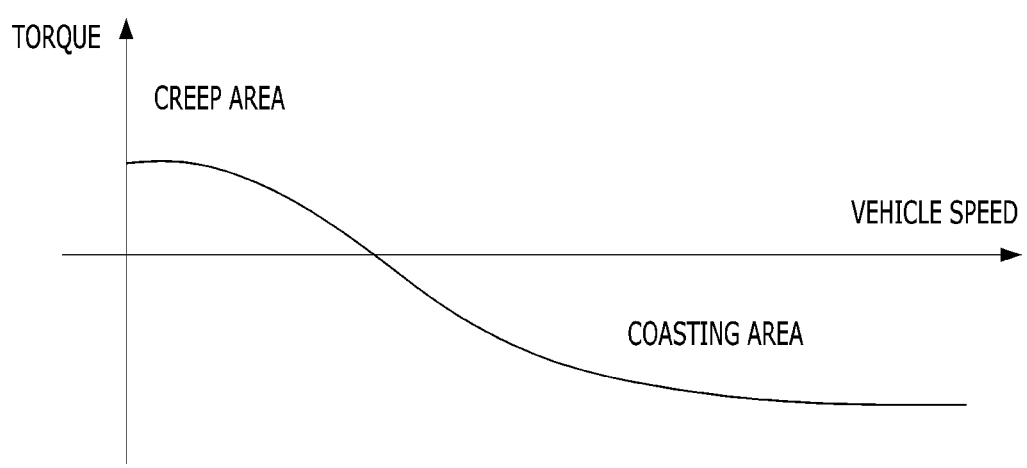
FIG. 1 is a diagram showing an example of a relationship between coasting torque and vehicle speed during coasting of a general vehicle.
Figure 2:
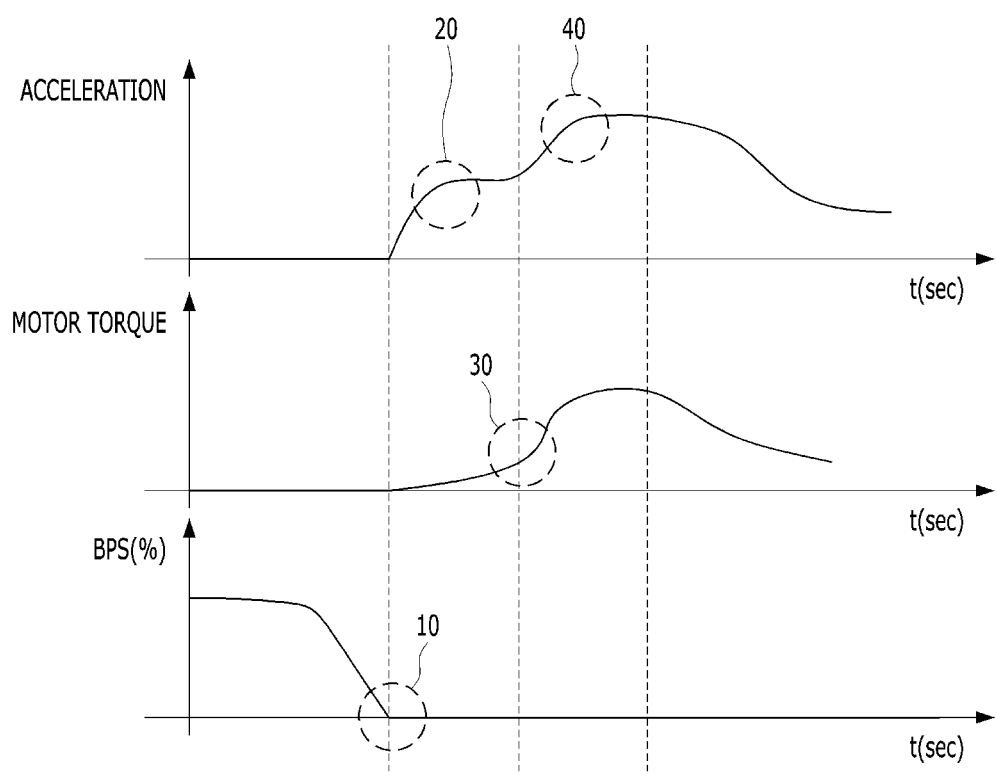
FIG. 2 is a diagram for illustrating a double launch effect when a general eco-friendly vehicle launches while stopped on a downhill road.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Exemplary embodiments of the present disclosure are described in detail so as for those of ordinary skill in the art to easily implement with reference to the accompanying drawings. However, the present disclosure may be implemented in various different forms and is not limited to these embodiments. To clearly describe the present disclosure, a part without concerning to the description is omitted in the drawings, and like reference numerals in the specification denote like elements.

In addition, when a certain part "includes" a certain component, this indicates that the part may further include another component instead of excluding another component unless there is no different disclosure. The same reference numbers will be used throughout the drawings and the specification to refer to the same parts.

According to embodiments of the present disclosure, pulse width modulation (PWM) control may be off when a vehicle is stopped on a downhill road, a transmission may be open when a brake pedal is released, and the transmission is slip-controlled and is then locked up when a predetermined condition is satisfied, and thus backlash shocks after primary acceleration occurs via a downhill road may be reduced or minimized.

Prior to the description of a launch control method according to an embodiment of the present disclosure, the configuration and control system of an eco-friendly vehicle applicable to embodiments will be described.

Figure 3:
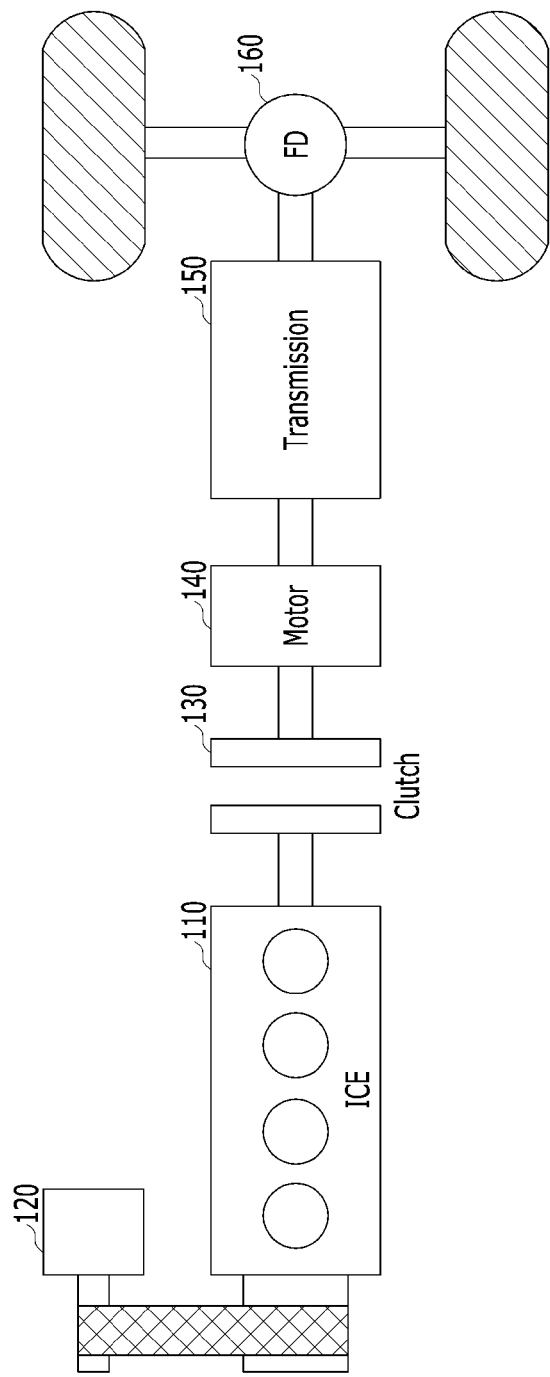
FIG. 3 is a diagram showing an example of the configuration of a powertrain of an eco-friendly vehicle.

FIG. 3 is a diagram showing an example of the configuration of a powertrain of an eco-friendly vehicle to which embodiments of the present disclosure are applicable.

FIG. 3 illustrates a powertrain of a hybrid vehicle employing a parallel type or transmission mounted electric drive (TMED) hybrid powertrain including an electric motor 140 (or a driving motor) and an engine clutch (EC) 130 that are installed between an internal combustion engine (ICE) 110 and a transmission 150.

In such a vehicle, in general, when a driver presses an accelerator after starting the vehicle, the motor 140 (or a driving motor) is driven using power of a battery while the engine clutch 130 is open and transmits power to move wheels through the transmission 150 and a final drive (FD) 160 (i.e., EV mode). As the vehicle gradually accelerates, high traction force is further desired, and in which case a starter generator motor 120 may be operated to drive the engine 110.

Accordingly, when the rotational speeds of the engine 110 and the motor 140 are the same as each other, the engine clutch 130 is then engaged such that both the engine 110 and the motor 140 drive the vehicle (i.e., transition to an HEV mode from an EV mode). When a predetermined engine off condition, such as vehicle deceleration, is satisfied, the engine clutch 130 is opened and the engine 110 stops (i.e., transition to an EV mode from an HEV mode). In addition, the hybrid vehicle converts traction force of a wheel into electric energy to recharge the battery, which is referred to as braking energy regeneration or regenerative braking.

The starter generator motor 120 functions as a starter motor when the engine is turned on and functions as a generator after the engine is turned on or when rotational energy is recovered during engine off, and thus, the starter generator motor 120 may also be referred to as a hybrid starter generator (HSG), and as desired, may be referred to as an auxiliary motor.

Figure 4:
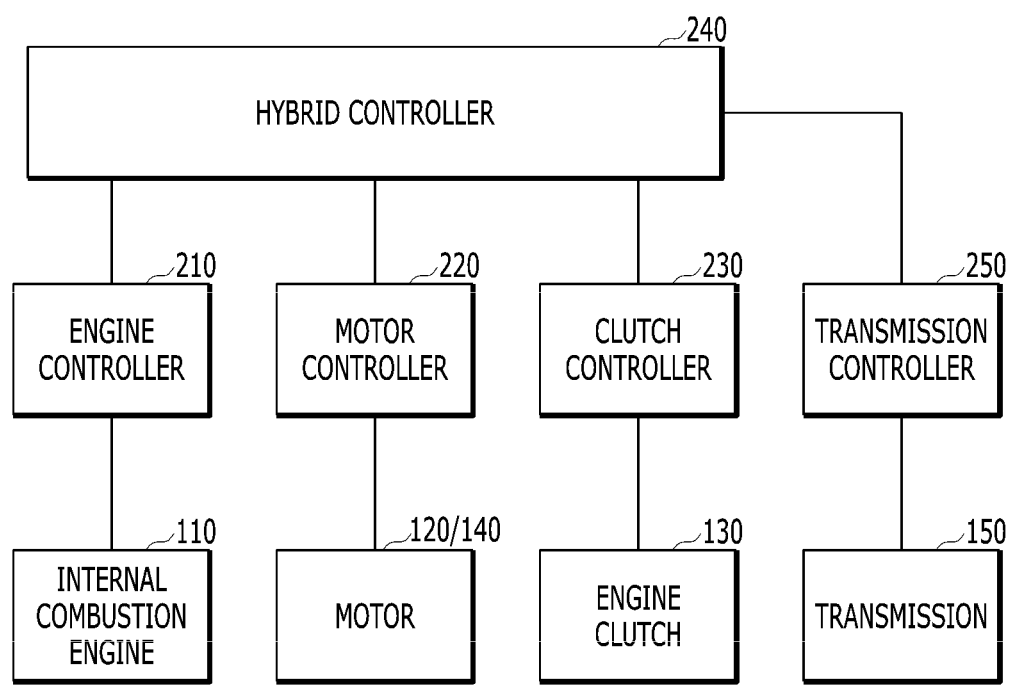
FIG. 4 is a block diagram showing an example of a control system of an eco-friendly vehicle.

A relationship between controllers in a vehicle to which the aforementioned powertrain is applied is illustrated in FIG. 4.

FIG. 4 is a block diagram showing an example of a control system of an eco-friendly vehicle to which embodiments of the present disclosure are applicable.

Referring to FIG. 4, in the hybrid vehicle to which embodiments of the present disclosure are applicable, the internal combustion engine 110 may be controlled by an engine controller 210, torque of the starter generator motor 120 and the driving motor 140 may be controlled by a motor control unit (MCU) 220, and the engine clutch 130 may be controlled by a clutch controller 230. Here, the engine controller 210 may also be referred to as an engine management system (EMS). In addition, the transmission 150 may be controlled by a transmission controller 250. As desired, the starter generator motor 120 and the driving motor 140 may be controlled by different separate motor controllers.

Each controller may be connected to a hybrid control unit (HCU) 240 for controlling an overall mode switching procedure as a high-level controller and may provide, to the hybrid controller 240, information desired to switch driving modes and to control an engine clutch during gear shifting, and/or information desired to control engine off, or may perform an operation according to a control signal under the control of the hybrid controller 240.

In more detail, the hybrid controller 240 may determine whether a mode is converted depending on a vehicle driving state. For example, the hybrid controller may determine an open time of the engine clutch (EC) 130 and may control hydraulic pressure (in the case of a wet EC) or control torque capacity (in the case of a dry EC) when the EC is opened. The hybrid controller 240 may determine an EC state (lock-up, slip, open, etc.) and may control a time for stoppage of fuel injection of the engine 110. The hybrid controller may transmit a torque command for controlling torque of the starter generator motor 120 to the MCU 220 to control engine off and may control engine rotational energy recovery. In addition, the hybrid controller 240 may transmit, to the transmission controller 250, a command for a transmission state and may transmit, to the motor controller 220, a creep torque control command in order to perform the launch control method according to embodiments of the present disclosure to be described below. In addition, the hybrid controller 240 may determine whether vehicle stoppage is controlled, whether launch is controlled, whether PWM control is performed, a state of a transmission, or the like.

Needless to say, it will be obvious to one of ordinary skill in the art that the aforementioned relationship between the controllers and functions/divisions of the controllers are exemplary and, thus, are not limited to the terms. For example, the hybrid controller 240 may be embodied by allowing any one of other controllers except for the hybrid controller 240 to provide a corresponding function or two or more of other controllers may provide the corresponding function in a distribution manner. In the case of an electric vehicle (EV), the hybrid controller 240 may be replaced with a vehicle control unit (VCU).

Hereinafter, based on the aforementioned configuration of a vehicle, a launch control method and the configuration of a vehicle for performing the method according to an embodiment of the present disclosure will be described.

First, the configuration of a controller for performing launch control in a situation in which a vehicle is stopped according to an embodiment of the present disclosure will be described with reference to FIG. 5.

Figure 5:
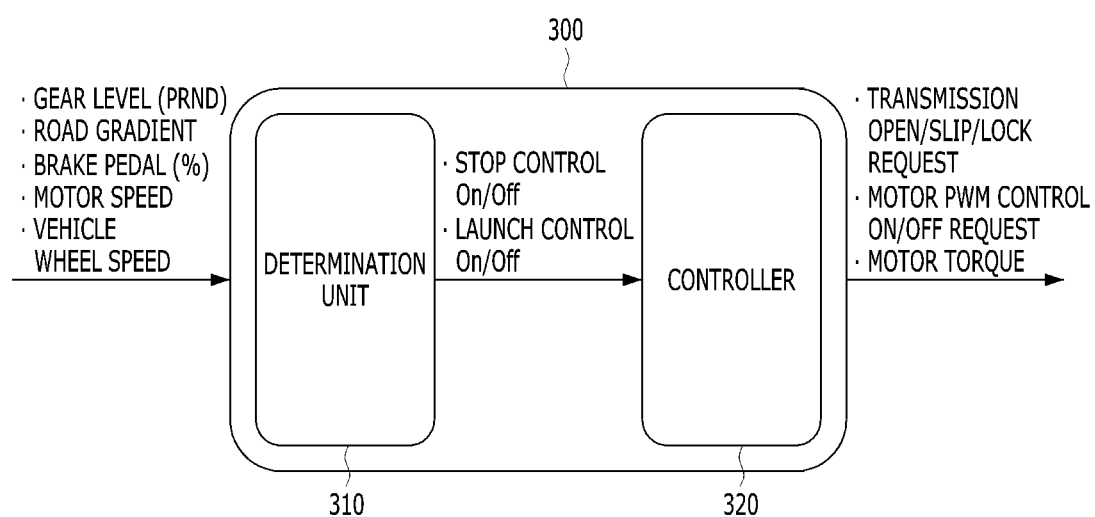
FIG. 5 is a diagram showing an example of the configuration of a controller for performing launch control in a situation in which a vehicle is stopped on a hill.

FIG. 5 is a diagram showing an example of the configuration of a controller for performing launch control in a situation in which a vehicle is stopped on a hill according to an embodiment of the present disclosure.

Referring to FIG. 5, a controller 300 for performing launch control according to an embodiment may include a determination unit 310 and a controller 320. The controller 300 may be the hybrid controller 240 in the case of a hybrid vehicle (HEV), and may be a vehicle control unit (VCU) in the case of an electric vehicle (EV), but the present disclosure is not limited thereto. Hereinafter, a function of each component will be described.

First, the determination unit 310 may determine whether stop control and launch control are on or off using a gear level state (Park Reverse Neutral Drive (PRND), a road gradient, a brake pedal (%), a motor speed (RPM), and vehicle speed (or wheel speed) as an input value. First, a condition in which stop control is enabled (on) will be described below.

1) Gear level stage D
2) Downhill road
3) Brake pedal manipulation
4) Vehicle speed (wheel speed) 0 Kph When all the conditions are satisfied, the determination unit 310 may determine whether stop control is enabled. When brake pedal manipulation is released in a state in which stop control is enabled, the determination unit 310 may determine stop control off and launch control enabling (on). When a motor speed enters a threshold range after launch control is enabled, the determination unit 310 may determine launch control off. Here, the threshold range may be a speed range that is determined through a test and may be about 400 to 500 rpm when the speed range is determined based on a motor speed at a time point when vehicle begins to travel, for example, when the vehicle speed is about 2 to 3 Kph, but the present disclosure is not limited thereto.

The determination unit 310 may notify the controller 320 about a determination result (i.e., request) of whether stop control and launch control are on/off.

The controller 320 may determine a transmission state, whether motor torque is PWM-controlled, and motor torque according to the stop control and launch control on/off request of the determination unit 310.

In detail, when there is the stop control on request, the controller 320 may determine motor torque as 0 (that is, a torque command corresponding to 0 is transmitted to a motor controller) and may also change control for generating creep torque of a motor, that is, PWM control to off. As such, unnecessary use of energy may be prevented and vehicle fuel efficiency may be enhanced. When there is the stop control on request, this means that a vehicle is sopped on a downhill road, and thus a gear of a transmission is in a rear alignment state, and in this regard, when torque is applied to a motor, backlash shocks may occur.

Accordingly, when there are the stop control off request and the launch control on request, the controller 320 may notify the transmission controller 250 about control of the transmission 150 in an open state in order to relieve backlash shocks. Then, the controller 320 may enable (on) PWM control of the motor 140 to generate creep torque from the motor, and when there is the launch control off request, the controller 320 may control the transmission 150 to be transitioned to a lock state through a slip state (that is, the transmission controller is notified).

An entire vehicle launch control based on the control operation of the controller 300 that has been described thus far will be described with reference to a flowchart of FIG. 6.

Figure 6:
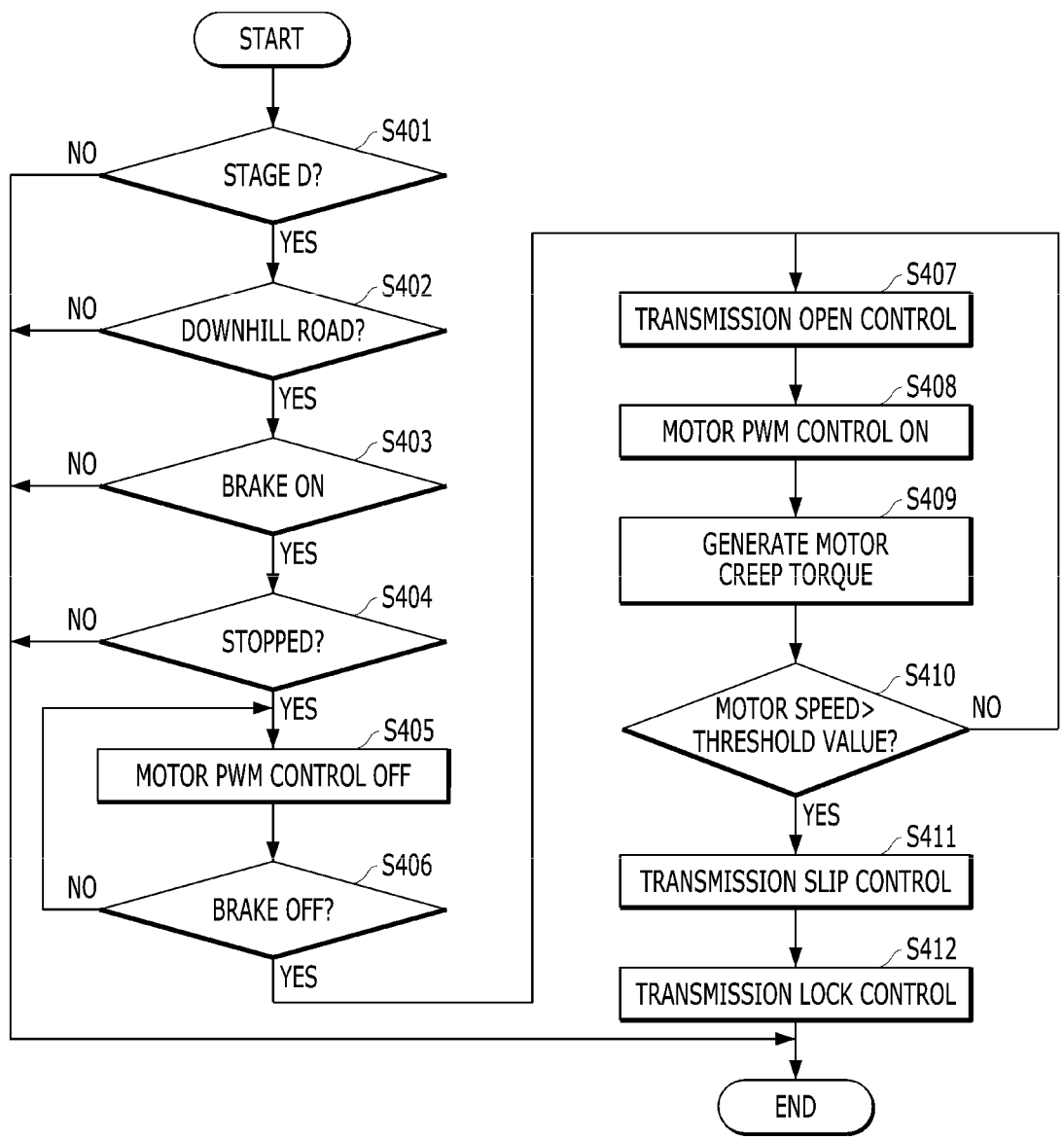
FIG. 6 is a flowchart showing an example of a launch control procedure in a state in which an eco-friendly vehicle is stopped on a downhill road.

FIG. 6 is a flowchart showing an example of a launch control procedure in a state in which an eco-friendly vehicle is stopped on a downhill road according to an embodiment of the present disclosure.

Referring to FIG. 6, first, the determination unit 310 may determine whether a vehicle is stopped. In detail, when a transmission lever is in a stage D, namely a drive stage (YES of S401), a gradient corresponds to a downhill road state (YES of S402), a brake pedal is manipulated (YES of S403), and a vehicle speed or a wheel speed corresponds to 0 and a current state is determined as a stationary state (YES of S404), the determination unit 310 may make a request to the controller 320 for stop control on. Thus, the controller 320 may perform control PWM control of a motor to be off (S405).

Then, when brake manipulation is released (YES of S406), the determination unit 310 may make a request for stop control off and launch control on to the controller 320, and accordingly, the controller 320 may control a transmission in an open state (S407) and may enable PWM control of the motor (S408).

As PWM control of the motor is enabled, creep torque may be generated in the motor (S409), and when a motor speed reaches a preset threshold range (or value) (YES of S410), the determination unit 310 may make a request for launch control off. Accordingly, the controller 320 may control the transmission in a slip (S411) and then may control the transmission in a lock state (S412).

The launch procedure while a vehicle is stopped in a downhill road that has been described thus far will be described with reference to a graph of FIG. 7.

Figure 7:
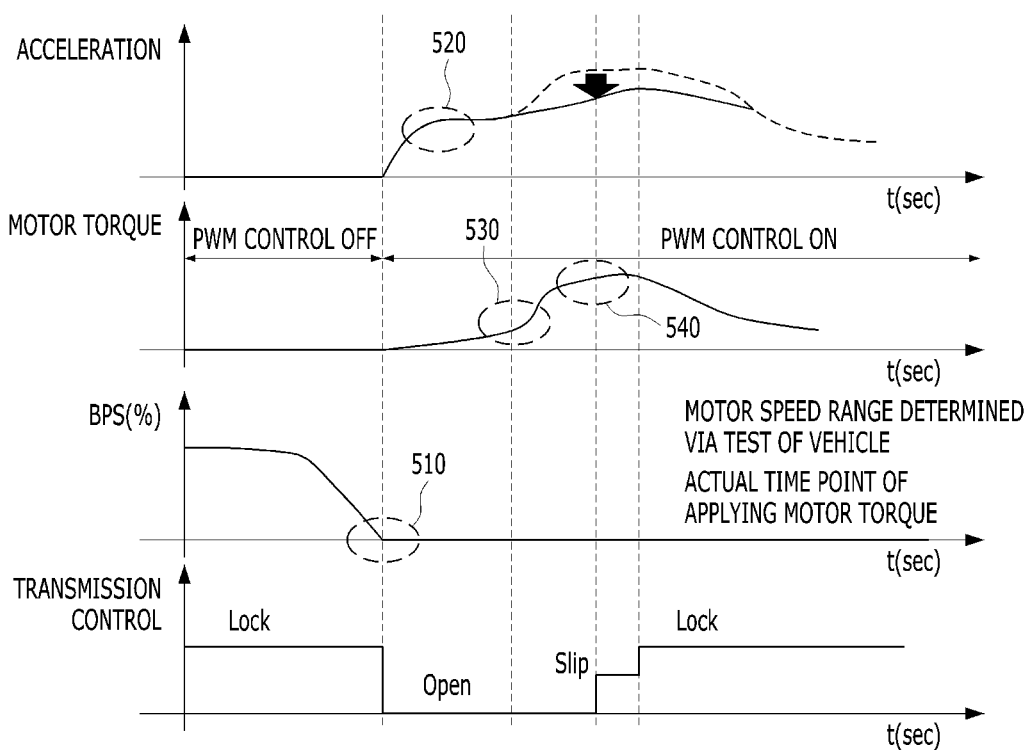
FIG. 7 is a diagram illustrating that a double launch effect is relieved based on a launch control when an eco-friendly vehicle is stopped in a downhill road.

FIG. 7 is a diagram for explanation of a form in which a double launch effect is relieved based on launch control when an eco-friendly vehicle is stopped in a downhill road according to an embodiment of the present disclosure.

FIG. 7 shows four graphs, the horizontal axis commonly indicates a time with respect to the three graphs, the first vertical axis from the above indicates acceleration, the second vertical axis indicates torque of a motor, the third vertical axis indicates a brake pedal sensor (BPS) value, and the fourth vertical axis indicates a transmission state.

Referring to FIG. 7, as stop control is on in a state in which a vehicle is stopped in a downhill road, PWM control begins in a state in which PWM control is released. A primary launch effect 520 occurs due to acceleration via a downhill road from a time point 510 when a driver releases a brake pedal. Then, when stop control is off and launch control is on as brake is released, a transmission may be opened. When PWM control begins on motor torque 530, after a while, launch control may be off at a time point 540 at which acceleration via creep torque of a motor is generated, that is, at a time point at which a motor speed enters the threshold range, and thus the transmission may be transitioned to a lock up state through a slip state. Accordingly, backlash shocks are relieved based on slip control, and thus linear acceleration compared with acceleration change (dotted line) based on general launch control may be achieved to relieve the secondary launch speed.

When control for relieving backlash shocks is performed in the aforementioned embodiments, information on corresponding control may be output in a predetermined form to be checked by a driver when or after control is performed. For example, an indicator indicating that control for relieving backlash shocks is performed may be lighted for a predetermined time on a cluster. In another example, information on acceleration corresponding to reduction in backlash shocks may be output to an acceleration graph or gage provided on a cluster or a display of a head unit.

The eco-friendly vehicle related to at least one embodiment of the present disclosure as configured above may effectively enhance the secondary launch effect in a situation in which a vehicle is stopped in a downhill road.

In particular, it may be effective that PWM control is off while a vehicle is stopped and backlash shocks of a transmission is relieved through transmission slip control, and thus the secondary launch effect may be overcome.

It will be appreciated by persons skilled in the art that that the effects that could be achieved with the present disclosure are not limited to what has been particularly described hereinabove and other advantages of the present disclosure will be more clearly understood from the detailed description.

The aforementioned present disclosure can also be embodied as computer readable code stored on a computer readable recording medium. The computer readable recording medium is any data storage device that can store data which can thereafter be read by a computer. Examples of the computer readable recording medium include a hard disk drive (HDD), a solid state drive (SSD), a silicon disc drive (SDD), read-only memory (ROM), random-access memory (RAM), CD-ROM, magnetic tapes, floppy disks, optical data storage devices, etc.

It will be apparent to those skilled in the art that various modifications and variations can be made in the present disclosure without departing from the spirit or scope of the disclosure. Thus, it is intended that the present disclosure cover the modifications and variations of this disclosure.

What is claimed is:

1. A launch control method of an eco-friendly vehicle which comprises an engine, a motor, an engine clutch coupled between the engine and the motor, and a transmission coupled between the motor and wheels of the eco-friendly vehicle, the method comprising:
    determining, by a controller, whether a first condition for enabling a preset stop control is satisfied;
    when the first condition is satisfied, turning off, by the controller, a control configured to generate a creep torque from the motor for the eco-friendly vehicle;
    in response that a brake is released from a pressed state under the preset stop control while the first condition is satisfied, controlling, by the controller, the transmission to transition from a lock state into an open state and enabling the control for generating the creep torque until revolutions per minute (RPM) of the motor enters a preset threshold range, wherein a gear arrangement of the transmission is in a rear alignment state when the brake is released from the pressed state; and
    when the RPM of the motor enters the preset threshold range while the transmission is in the open state, sequentially controlling, by the controller, the transmission from a slip state to the lock state,
    wherein the first condition is satisfied when a transmission lever is in a drive stage, the eco-friendly vehicle is in a downhill road situation, the brake is manipulated, and a speed or a wheel speed of the eco-friendly vehicle is zero (0).

2. The method of claim 1, wherein the preset threshold range corresponds to an RPM at a time point when driving begins with the control for generating the creep torque.

3. The method of claim 1, wherein the transmission is in the rear alignment state when the first condition is satisfied.

4. The method of claim 1, wherein the control for generating the creep torque includes a pulse width modulation (PWM) control.

5. The method of claim 1, further comprising:
    outputting, by a display, predetermined visual information indicating that the controlling the transmission in the lock state through the slip state is performed.

6. An eco-friendly vehicle including an engine, a motor, an engine clutch coupled between the engine and the motor, and a transmission coupled between the motor and wheels of the eco-friendly vehicle, the eco-friendly vehicle comprising:
    a motor controller configured to control the motor;
    a transmission controller configured to control the transmission connected to the motor; and
    a hybrid controller configured to:
        transmit a creep torque control command to the motor controller and to transmit a command for a transmission state to the transmission controller,
        determine whether a first condition for enabling a preset stop control is satisfied,
        perform the preset stop control to stop generating a creep torque of the motor when the first condition is satisfied,
        control the transmission to transition from a lock state into an open state and enable the control for generating the creep torque until revolutions per minute (RPM) of the motor enters a preset threshold range when a brake is released from a pressed state under the preset stop control while the first condition is satisfied, and
        sequentially control the transmission from a slip state to the lock state when the RPM of the motor enters the preset threshold range while the transmission is in the open state,
    wherein the first condition is satisfied when a transmission lever is in a drive stage, the eco-friendly vehicle is in a downhill road situation, the brake is manipulated, and a vehicle speed or a wheel speed is zero (0), and
    wherein a gear arrangement of the transmission is in a rear alignment state when the brake is released from the pressed state.

7. The eco-friendly vehicle of claim 6, wherein the preset threshold range corresponds to an RPM at a time point when driving begins with the control for generating the creep torque.

8. The eco-friendly vehicle of claim 6, wherein the transmission is in the rear alignment state when the first condition is satisfied.

9. The eco-friendly vehicle of claim 6, wherein the control for generating the creep torque includes a pulse width modulation (PWM) control.

10. The eco-friendly vehicle of claim 6, further comprising:
    a display configured to output predetermined visual information indicating that the controlling the transmission in the lock state through the slip state is performed.

11. A controller for an eco-friendly vehicle which comprises an engine, a motor, an engine clutch coupled between the engine and the motor, and a transmission coupled between the motor and wheels of the eco-friendly vehicle, the controller comprising:
    a determination unit including a processor configured to determine whether a first condition for enabling a preset stop control is satisfied, and configured to make a first request for enabling the preset stop control when the first condition is satisfied; and a controller configured to turn off a control configured to generate a creep torque from the motor upon the first request, wherein the processor of the determination unit is configured to make a second request to the controller for turning off the preset stop control, control the transmission to transition from a lock state into an open state and enabling a launch control in response that a brake is released from a pressed state under the preset stop control while the first condition is satisfied, wherein a gear arrangement of the transmission is in a rear alignment state when the brake is released from the pressed state;

wherein the controller is configured to control the transmission in the open state and enable the control for generating the creep torque upon the second request until revolutions per minute (RPM) of the motor enters a preset threshold range;

wherein the processor of the determination unit is configured to make a third request to the controller for turning off the launch control upon determining that the RPM of the motor enters the preset threshold range while the transmission is in the open state;

wherein the controller is configured to sequentially control the transmission from a slip state to the lock state upon the third request, and wherein the first condition is satisfied when a transmission lever is in a drive stage, the eco-friendly vehicle is in a downhill road situation, the brake is manipulated, and a vehicle speed or a wheel speed is zero (0).

\* \* \* \* \*